US009823681B2

(12) United States Patent
Valle et al.

(10) Patent No.: US 9,823,681 B2
(45) Date of Patent: Nov. 21, 2017

(54) ACTUATION DEVICE OF A BAR-END BICYCLE GEARSHIFT

(75) Inventors: Maurizio Valle, Vicenza (IT); Massimo Dal Pozzo, Rotzo (VI) (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 13/595,387

(22) Filed: Aug. 27, 2012

(65) Prior Publication Data
US 2013/0220062 A1 Aug. 29, 2013

(30) Foreign Application Priority Data
Aug. 26, 2011 (EP) ..................................... 11006979

(51) Int. Cl.
B62M 25/04 (2006.01)
G05G 1/04 (2006.01)
B62M 25/08 (2006.01)
B62K 23/06 (2006.01)

(52) U.S. Cl.
CPC .............. *G05G 1/04* (2013.01); *B62K 23/06* (2013.01); *B62M 25/04* (2013.01); *B62M 25/08* (2013.01); *Y10T 74/20612* (2015.01)

(58) Field of Classification Search
CPC ...... B62M 25/04; B62M 25/06; B62M 25/08; G05G 1/04
USPC ...... 74/473.12, 473.14, 488, 49, 502.2, 523, 74/525; 200/61.88
See application file for complete search history.

(56) References Cited

U.S. PATENT DOCUMENTS

| 2,583,609 | A  | * | 1/1952 | Souhart | ........................... 74/489 |
| 7,007,785 | B2 | * | 3/2006 | Uno | ........................ B62K 23/06 |
| | | | | | 192/217 |
| 2006/0266594 | A1 | | 11/2006 | Tsai | |
| 2007/0175290 | A1 | * | 8/2007 | Fujii | ........................ B62K 23/02 |
| | | | | | 74/502.2 |
| 2007/0193387 | A1 | * | 8/2007 | Nakano | .................. B62K 23/02 |
| | | | | | 74/501.6 |
| 2007/0221008 | A1 | * | 9/2007 | Shipman et al. | ............. 74/502.2 |
| 2007/0261508 | A1 | * | 11/2007 | Acenbrak | .................... 74/502.2 |
| 2009/0235772 | A1 | * | 9/2009 | Naka et al. | .................. 74/502.2 |
| 2010/0294068 | A1 | * | 11/2010 | Fujii et al. | ................. 74/473.13 |

(Continued)

FOREIGN PATENT DOCUMENTS

| EP | 1837275 | A2 | 9/2007 |
| EP | 2105377 | A2 | 9/2009 |
| EP | 2253531 | A1 | 11/2010 |

(Continued)

OTHER PUBLICATIONS

European Search Report for Appln. No. 11006979.6-1254 dated Mar. 13, 2012.

(Continued)

*Primary Examiner* — Thomas C Diaz
(74) *Attorney, Agent, or Firm* — Volpe and Koenig, P.C.

(57) ABSTRACT

An actuation device for bar-end bicycle gearshift comprises a mount adapted to be mounted to the end of handlebars facing forwards in the direction of travel. An actuation part is mounted on the mount in a neutral position with respect to the mount when no gearshifting is commanded. An adjuster is provided for adjusting the neutral position of the actuation part with respect to the mount. A cyclist can adjust the neutral position based on personal physical characteristics and preferences.

18 Claims, 9 Drawing Sheets

(56) References Cited

U.S. PATENT DOCUMENTS

2011/0011197 A1 1/2011 Oku et al.

FOREIGN PATENT DOCUMENTS

| GB | 644090 A | 10/1950 |
|----|----------|---------|
| JP | 58098291 | 7/1983 |
| WO | 2006050153 A2 | 5/2006 |

OTHER PUBLICATIONS

Japanese Office Action for Application No. 2012-184995, dated Jan. 5, 2016.

* cited by examiner

ACTUATION DEVICE OF A BAR-END BICYCLE GEARSHIFT

FIELD OF THE INVENTION

The present invention refers to an actuation device of a bar-end bicycle gearshift.

BACKGROUND OF THE INVENTION

It is well-known that in bicycles intended for racing there is an ongoing search for solutions to improve performance. In particular, for bicycles intended for speed races, typically such as time trials, it is particularly important to have a good aerodynamic configuration of all of the components of the bicycle. Moreover, a factor in the improvement of performance is considered to be the efficiency of all of the commands and also their ease and safety of actuation, so that the cyclist is put in such conditions that he can concentrate on the physical effort without hindrances due to difficulties in actuating the commands.

Recently, handlebars have become well-established that are specialised particularly suitable for racing, which handlebars have two ends facing substantially forwards, allowing the cyclist to maintain a body position very inclined forwards, aerodynamically efficient.

With these handlebars, specific actuation devices have also become well-established, both for brakes and for gearshifts; these devices are commonly called bar-end devices since they are housed right at the ends of the handlebars, so that the cyclist can easily actuate them from his position.

Electric actuation devices for gearshifts are also known, in which—for each gearshift—the cyclist must actuate a first switch to command upward gearshifting and a second switch for downward gearshifting.

One known device provides a substantially cylindrical body, which forms an ideal extension of the cylindrical tube of the handlebars.

The Applicant has realised that it is possible to improve the overall efficiency of an actuation device of the gearshift of this type by designing it specifically to allow every cyclist to take up the most suitable hand position, and to allow him to keep such a position substantially unaltered during the actuation of the device.

SUMMARY OF THE INVENTION

The present invention provides an actuation device for a bar-end bicycle gearshift, for which it is desirable to have an actuation part in a neutral position when no gearshift is commanded, that includes structure for adjusting the neutral position of the actuation part.

BRIEF DESCRIPTION OF THE DRAWINGS

The characteristics and advantages of the invention will become clearer from the following description of some preferred embodiments thereof, made with reference to the attached drawings. In such drawings.

DETAILED DESCRIPTION OF THE PREFERRED EMBODIMENTS

Introduction

The actuation device of a bar-end bicycle gearshift comprises a mount part suitable for being mounted at the end of handlebars facing forwards in the direction of travel of the bicycle, and an actuation part mounted on the mount part, in which the actuation part is in a neutral position with respect to the mount part when no gearshifting is commanded, and it is characterised in that it comprises means for adjusting said neutral position of the actuation part with respect to the mount part.

Each cyclist can thus adjust the position taken up by the actuation part in normal travel, when the gearshift is not actuated, based on his own physical characteristics and his own preferences. It should be noted that the neutral position may or may not be maintained even during gearshifting; in other words, the command of gearshifting may or may not imply a movement of the actuation part from the neutral position, according to the type of command.

Preferably, the device comprises electric actuation means associated with the actuation part. An electric command system is particularly suitable for allowing the cyclist to carry out gearshifting with minimal movements, of the hands or of the fingers, and thus it facilitates maintaining the best aerodynamic position during gearshifting.

Preferably, the actuation part is in the form of a lever, with at least one tapered portion having a cross section the area of which reduces going away from the mount part in the direction of travel of the bicycle.

The reduction of the cross section allows the cyclist holding the device to keep his hand more closed, pointing forwards with respect to the direction of travel, so as to take up an aerodynamically more favourable position on the end of the handlebars.

Preferably, the actuation part comprises a first concave upper pressing area adjacent to the mount part, and a second lower pressing area, remote from the mount part.

The cyclist, whilst gripping the handlebars at the end, while pedaling, can engage the first pressing area with his thumb, bent to grasp the actuation part in a position very close to the end of the handlebars, where the hand is rested, with the index finger bent underneath the actuation part. As a result of this, the position is even more aerodynamically favourable, because the thumb is partially sunk inside the actuation part due to the concavity of the first pressing area.

Preferably, the actuation part also comprises a third concave lower pressing area, between the mount part and the second pressing area. This third pressing area makes it possible to have an alternative position for the index finger, bent underneath the actuation part instead of stretched out. This position is also aerodynamically favourable, because the index finger remains partially sunk inside the concave pressing area.

Preferably, the actuation part also comprises a fourth upper pressing area, remote from the mount part. This fourth pressing area makes it possible to have an alternative position for the thumb, extended above the actuation part instead of bent. This position is also aerodynamically favourable, because the thumb is extended forwards.

The fourth pressing area can be flat or preferably slightly concave, so as to match the typical anatomy of the thumb, in which the distal phalange (the outermost one) projects slightly further (towards the other fingers) than the proximal phalange, so as to improve aerodynamic conditions.

The second pressing area can be substantially flat or preferably slightly concave, so as to match the typical anatomy of the index finger, in which the phalanges do not have marked projections, so as to promote aerodynamic conditions.

Preferably, said at least one tapered portion is an end portion, remote with respect to the mount part, having a shape—in side and/or plan view—that is tapered going away from the mount part. Both of these shape characteristics give the actuation part better aerodynamics.

Preferably, the mount part comprises an expander for mounting to the end of the handlebars, said expander comprising splayable sectors and a free angular space, for the passage of an electric cable for connecting to the electric actuation means. In this way, the cable typical of electric command systems can be easily passed inside the tube of the handlebars; the cable is thus better protected and the aerodynamics of the bicycle is better, as is its appearance.

In a first preferred embodiment, the actuation part is mounted so as to be angularly mobile with respect to the mount part between a first operative position and a second operative position, said electric actuation means comprising two switches mounted in one from said mount part and said actuation part and actuated by respective strikers provided in the other from said mount part and said actuation part, when the actuation part is taken into the first and into the second operative position, respectively, each of said switches being intended to command upward or downward gearshifting, respectively. In this way, the cyclist can obtain gearshifting without substantially altering the grip of his hands on the device, by simply slightly moving the actuation part that he already has in his hands, typically upwards or downwards; therefore, both the maximum speed of maneuvering and the holding of the optimal aerodynamic position are ensured.

Preferably, the means for adjusting the neutral position are suitable for varying the angular position of the switches and/or of the strikers, so as to adjust the two operative positions and the neutral position together.

Preferably, the two switches are carried by a plate mounted fixed on the actuation part, the two strikers are formed on a striker-carrying assembly fixed in an adjustable manner with respect to the mount part, and a spring is mounted acting between the actuation part and said striker-carrying assembly, to keep the actuation part in the neutral position in the absence of stresses.

Preferably, the means for adjusting the neutral position of the actuation part comprise a lid on which the striker-carrying assembly is mounted in fixed position, a slot formed in the lid, a screw inserted in the slot to fix the lid to the mount part in adjustable position, in which the screw makes it possible to vary the angular position of the lid and with it of the striker-carrying assembly with respect to the mount part if loosened, to lock it if tightened.

These characteristics allow making a very functional device, without however introducing excessive constructive complications.

In a second preferred embodiment, said electric actuation means comprise two switches mounted on the actuation part, accessible from the top thereof, each of said switches being intended to command upward or downward gearshifting, respectively. In this way, the cyclist can obtain gearshifting without altering the grip of his hands on the device too much, by simply slightly moving the thumb so as to actuate one or the other of the two switches. Also in this embodiment, both maximum speed of maneuvering and the substantial holding of the optimal aerodynamic position are ensured, since just the thumb is moved, while the rest of the hand can remain in position.

Preferably, the means for adjusting the neutral position comprise a threaded pin between the actuation part and the mount part, in which the threaded pin makes it possible to vary the angular position of the actuation part with respect to the mount part if loosened, and to lock it if tightened.

The first or second embodiments are preferred basically according to the preferences of each cyclist. The first allows gearshifting to be obtained by moving the actuation part, without modifying the grip apart from following the small movement of the actuation part; the second allows gearshifting to be obtained by moving a single finger, without moving the rest of the hand at all. It is foreseeable that the first embodiment will be preferred by cyclists that look for the maximum aerodynamic perfection, whereas the second will be preferred by cyclists that look for the maximum control of the grip.

Detailed Descriptions

FIGS. 1-9 show an electric actuation device 100 of a gearshift of a racing bicycle (not shown), in particular for speed races, according to a first embodiment of the invention. The device 100 is a so-called bar-end device, mounted to the end M of bicycle handlebars of the type used on racing bicycles, and even more specifically specialised bicycles for time trials; in such handlebars, the end M faces forwards with respect to the direction of forward motion of the bicycle, according to a main axis A. The same handlebars can also be provided with conventional ends, i.e. not facing forwards, to also give the cyclist the possibility of a conventional grip.

Figure 1:
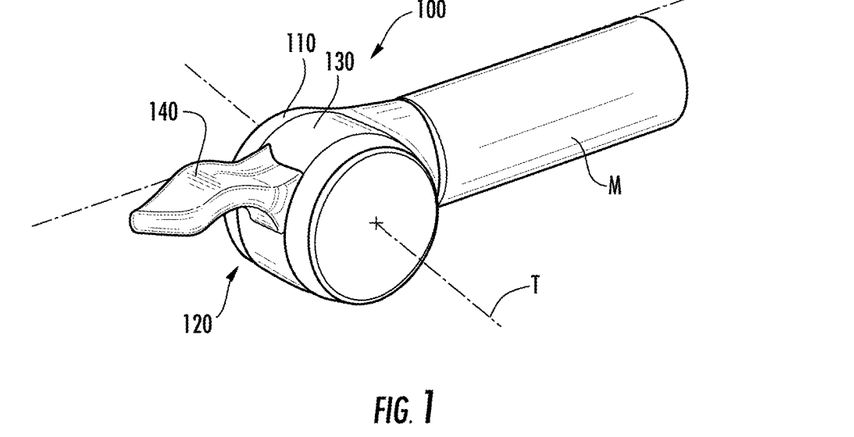
FIG. 1 is a perspective view of an electric actuation device according to a first embodiment of the invention, mounted on an end of handlebars.

The device 100 comprises an mount part 110 suitable for being mounted to the end M of handlebars and an actuation part 120, supported by the mount part 110 so as to be angularly mobile with respect to an axis T, transversal with respect to the direction A.

The actuation part 120 comprises a substantially cylindrical and hollow body 130, coaxial to the axis T, and an extension 140, projecting with respect to the body 130 in the direction of the main axis A, which is substantially tangential to the upper part of the body 130. In use, the extension 140 thus faces forwards in the direction of travel of the bicycle.

The extension 140 of the actuation part 120 comprises a first concave upper pressing area 141, adjacent to the body 130, and a second lower pressing area 142, remote from the body and preferably substantially flat or slightly concave.

The extension 140 also comprises a third concave lower pressing area 143, between the body 130 and the second pressing area 142.

The extension 140 also comprises a fourth upper pressing area 144, remote from the body 130, preferably slightly concave.

Figure 2:
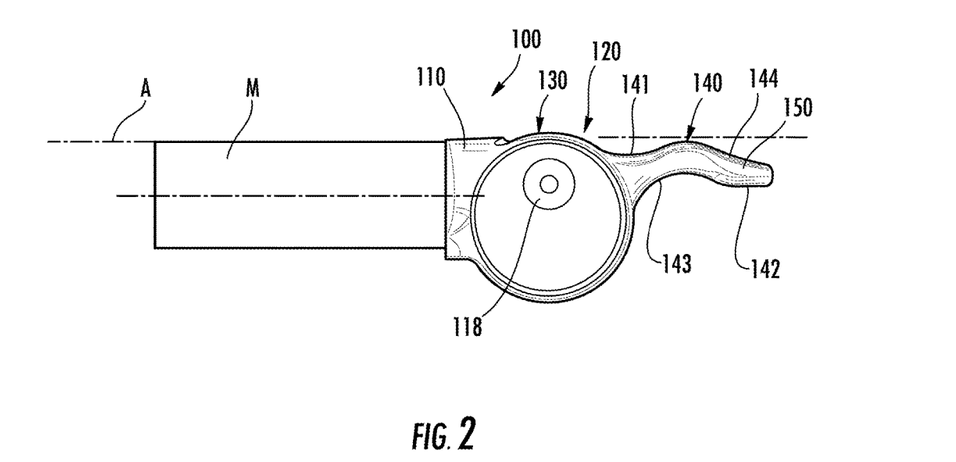
FIG. 2 is a side view of the device of FIG. 1.
Figure 3:
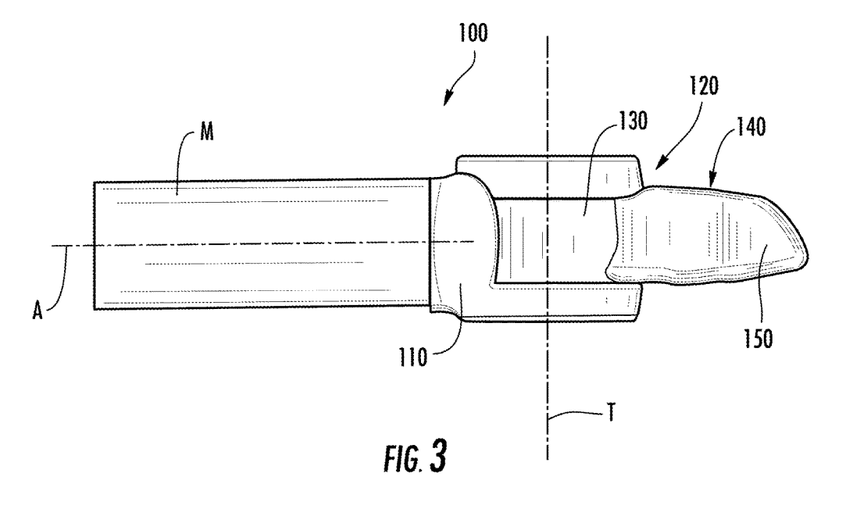
FIG. 3 is a top view of the device of FIG. 1.

The actuation part 120, more specifically at its extension 140, is in the form of a lever, tapered going away from the mount part 110, see in particular FIGS. 2 and 3. More specifically, the extension 140 of the actuation part 120 has an end portion 150, at the second and fourth pressing areas 142 and 144, remote with respect to the mount part 110; the end portion 150 is tapered, i.e. it has a cross section the area of which reduces going away from the mount part 110 in the direction of travel of the bicycle. Even more specifically, the end portion 150 is shaped—in plan and/or in a side view—tapered going away from the mount part 110.

Figure 4:
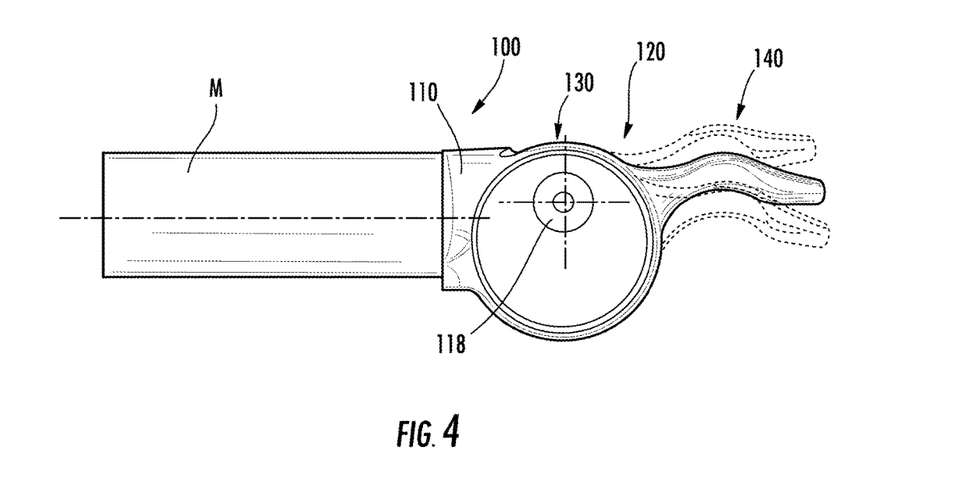
FIG. 4 is a side view of the device of FIG. 1, in which three positions of the actuation part are shown.

The actuation part 120—as stated—is angularly mobile with respect to the mount part 110, and more specifically it is mobile between an intermediate neutral position (shown for example in FIG. 2 and with a full line in FIG. 4) and two operative positions (shown with a dashed line in FIG. 4); as illustrated in FIG. 4, the two operative positions each correspond to a limited angular movement of the actuation part 120, in the two directions (i.e. upwards and downwards) from the neutral position.

In the neutral position, no gearshifting is commanded, whereas in each of the two operative positions upward or downward gearshifting is respectively commanded. For this purpose (see in particular FIGS. 7 and 8), the device 100 comprises electric actuation means associated with the actuation part 120. More specifically, these means comprise two switches 161 and 162, mounted on a plate 163 and connected to a multi-conductor electric cable 164, and two strikers 171 and 172 formed on a striker-carrying assembly 173.

Figure 7:
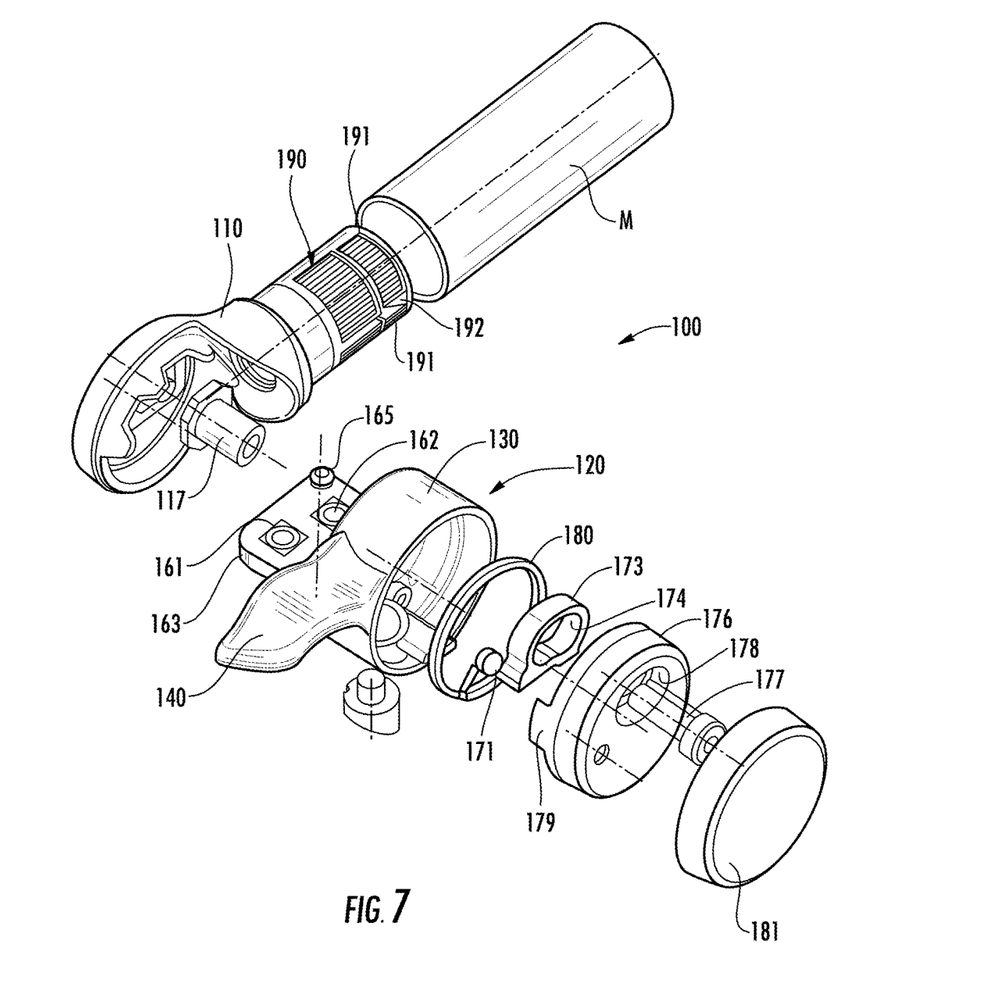
FIG. 7 is an exploded perspective view of the device of FIG. 1.
Figure 8:
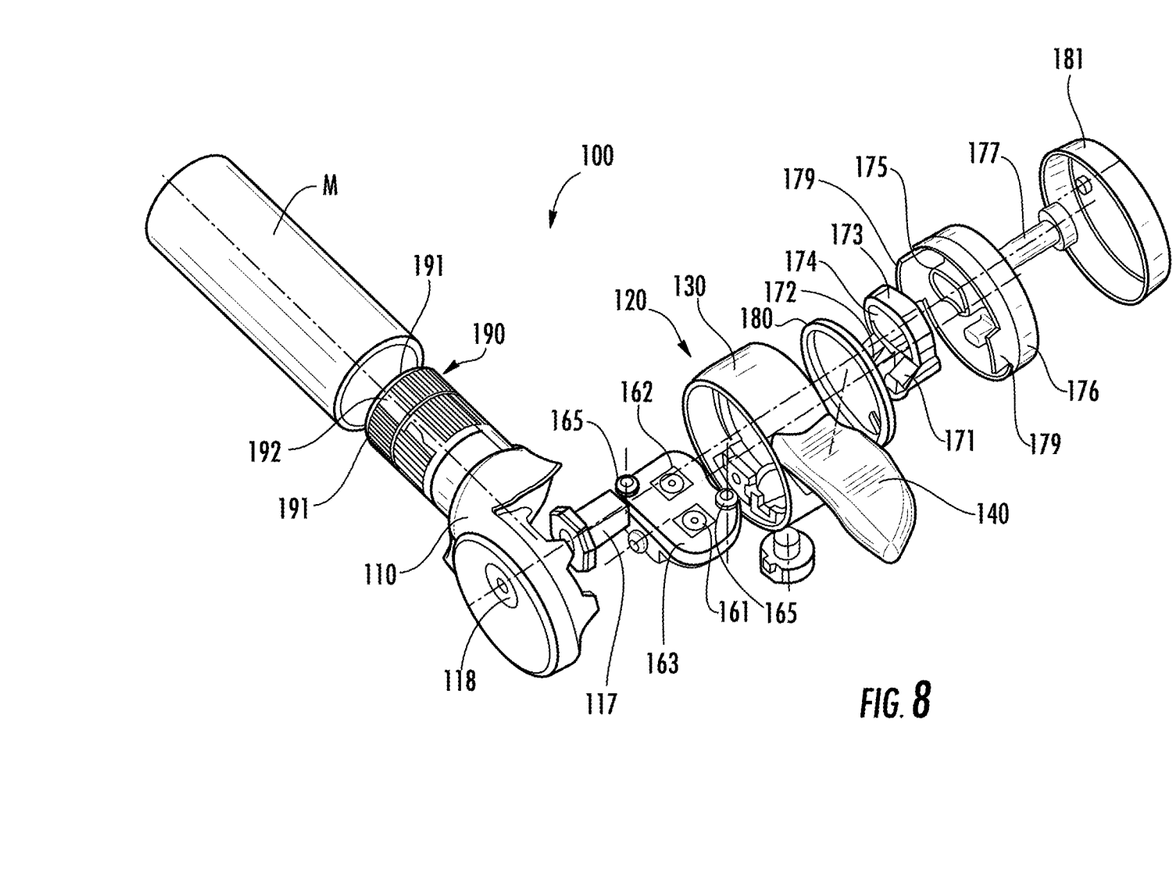
FIG. 8 is a perspective view analogous to FIG. 7, taken from a different angle.
Figure 9:
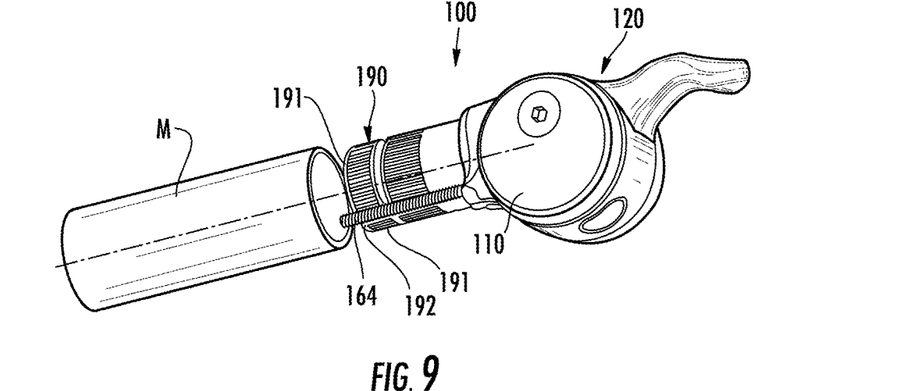
FIG. 9 is a perspective view of the device of FIG. 1, partially removed from the end of handlebars.

The plate 163 is mounted fixed on the actuation part 120, inside the body 130, with screws 165.

The striker-carrying assembly 173 is fixed in an adjustable manner with respect to the mount part 110. More specifically, the striker-carrying assembly 173 is provided with a seat 174 mounted with shape coupling on a profile 175 formed on a lid 176. The lid 176 is mounted fixed to the mount part 110, through the hollow body 130 of the actuation part 120, by means of a screw 177, which engages on one side with its own threaded stem in a threaded bush 117 fixed to the mount part 110 by means of a screw 118, and on the other side it engages with its widened head in a slot 178 formed in the lid 176. Two projections 179 formed on the lid 176 go into abutment against the mount part 110, ensuring that it is in any case ensured that there is the possibility of angular movement of the actuation part 120. Incidentally, the profile 175 extends around the slot 178. A spring 180 is mounted between the body 130 of the actuation part 120 and the lid 176 (and therefore the striker-carrying assembly 173), to keep the actuation part 120 elastically in its neutral position, when not stressed by the cyclist for gearshifting. A cover 181 is pressure fixed on the lid 176, so as to laterally close the device 100.

Figure 5:
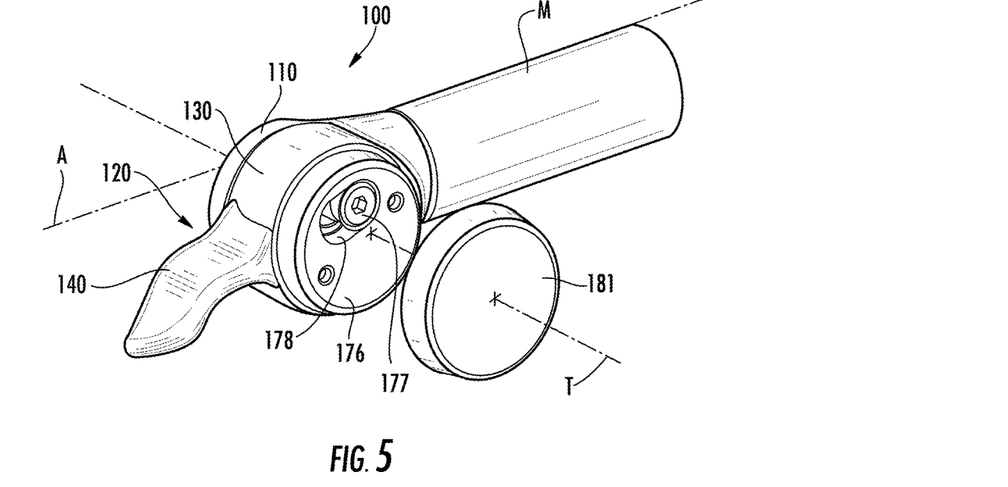
FIG. 5 is a perspective view of the device of FIG. 1, adjusted in a second way, with a cover partially removed.
Figure 6:
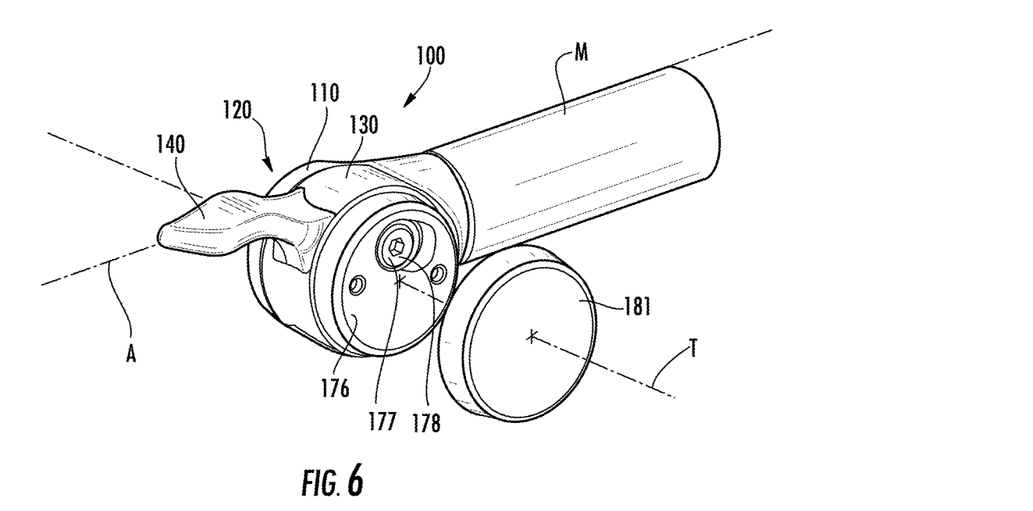
FIG. 6 is a perspective view of the device of FIG. 1, adjusted in a third way, with the cover partially removed.

The angular position of the lid 176 (and with it of the striker-carrying assembly 173 and therefore of the strikers 171 and 172) can be varied by acting on the screw 177, after having removed the cover 181: when the screw 177 is loosened, the lid 176 can be moved angularly with respect to the mount part 110, within the limits permitted by the size of the slot 178, whereas when the screw 177 is tightened, the angular position of the lid 176 is locked. FIGS. 5 and 6 illustrate the two extreme angular positions that the lid 176 can take up and consequently the two extreme positions for the actuation part 120 in its neutral position.

The movement of the actuation part 120 from the neutral position (FIG. 4, intermediate position with a full line) to one of the two operative positions (FIG. 4, extreme positions with a broken line) ensures that one or other of the strikers 171, 172 acts on the respective switch 161, 162, thus triggering the electric gearshifting command, upward or downward. The ways of managing this signal to obtain gearshifting are per se known in the field and will not be described.

Of course, it is also possible to have an inverse configuration, so to speak, in which the switches are mounted on the mount part and the strikers are mounted on the actuation part.

The device 100 also comprises an expander 190 (per se known and not described in detail) mounted on the mount part 110 for fixing inside the end M of handlebars. The expander 190 comprises splayable sectors 191 and a free angular space 192 between the sectors 191, for the passage of the cable 164 inside the end M of handlebars; see FIGS. 7, 8 and 9.

Figure 10:
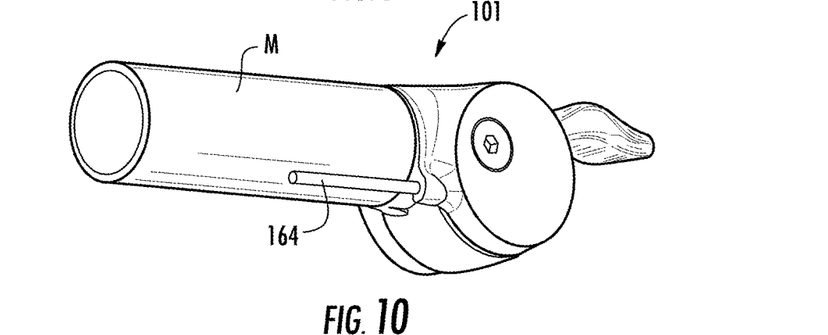
FIGS. 10 and 11 are perspective views of two variants of the device of FIG. 1.

FIG. 10 shows a first variant 101 of the electric actuation device according to the embodiment of the invention just described. The device 101 differs from the device 100 just in that it provides for the passage of the cable 164 outside the end M of the handlebars; all of the other characteristics are identical to those of the device 100 and therefore they are neither described nor illustrated in detail.

Figure 11:
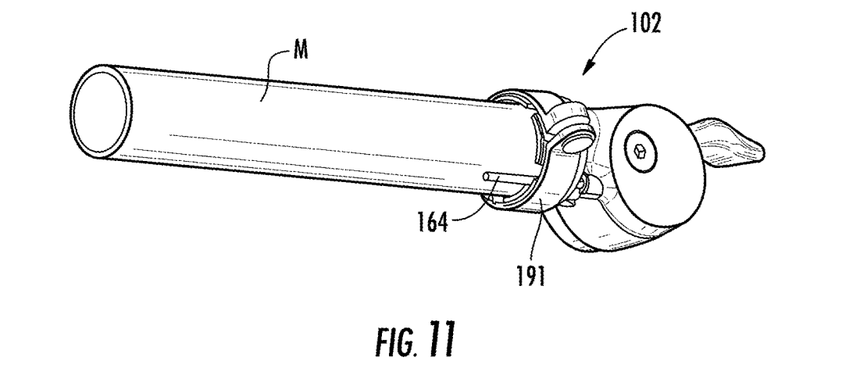

FIG. 11 shows a second variant 102 of the electric actuation device according to the embodiment of the invention just described. The device 102 differs from the device 100 just in that it provides for the passage of the cable 164 outside the end M of the handlebars and for the fixing to the end M of the handlebars by means of an outer strap 191 instead of the inner expander; all of the other characteristics are identical to those of the device 100 and therefore they are neither described nor illustrated in detail.

Thanks to the particular operation of the device 100 (or 101 or 102), the cyclist can adjust the neutral position of the actuation part 120 by acting on the screw 177 as stated above. Any variation of the neutral position implies a consequent variation of the operative positions corresponding to gearshifting, so that the movement of the actuation part 120 (with respect to the neutral position) to obtain gearshifting always remains the same. The cyclist can easily choose the preferred position, according to his own physical characteristics (morphology of the hands) and/or according to his own grip preferences and in general his preferred posture on the bicycle.

Once the neutral position has been set, during use the cyclist grips the handlebars at the end M, with the hand resting on the mount part 110. In a preferred configuration, the cyclist holds his thumb resting on the first pressing area 141, above the extension 140, and the index finger resting on the second pressing area 142 under the extension 120. The thumb is partially sunk into the actuation part 120 due to the concave shape of the first pressing area 141.

With the fingers in this position, the combination of the hand and the device 100 assumes an aerodynamically favourable configuration. Moreover, the cyclist can substantially maintain such a position during any gearshifting, because both the thumb and the index finger are already in a position suitable for acting directly and immediately on the actuation part 120, by lifting it or lowering it to obtain the desired gearshifting.

An alternative position for the index finger is offered by the third pressing area 143. When resting in this area, the index finger is bent, partially sunk into the actuation part 120 thanks to the concave shape of the third pressing area 143. Also in this case, the overall configuration is aerodynamically favourable and the possibilities of manoeuvre remain substantially unaltered.

An alternative position for the thumb is offered by the fourth pressing area 144. When resting in this area, the thumb is stretched out, more than when resting on the first pressing area 141, and partially sunk into the actuation part 120 thanks to the concave shape of the fourth pressing area 144. Also in this case, the overall configuration is aerodynamically favourable and the possibilities of manoeuvre remain substantially unaltered.

In practice, the cyclist has two alternative positions available both for the thumb, and for the index finger. This possibility is certainly useful, because it does not oblige the cyclist to always maintain the same position (with the risk of cramping) without moreover penalizing aerodynamic functionality.

FIGS. 12-17 show an electric actuation device 200 of a gearshift of a racing bicycle (not shown), in particular for speed races, according to a second embodiment of the invention.

Figure 12:
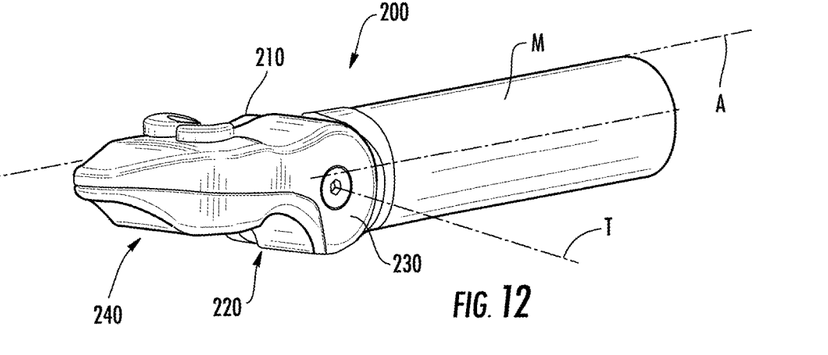
FIG. 12 is a perspective view of an electric actuation device according to a second embodiment of the invention, mounted on an end of handlebars.

The device 200 comprises an mount part 210 adapted to be mounted to the end M of handlebars and an actuation part 220, supported by the mount part 210 so as to be angularly mobile with respect to an axis T, transversal with respect to the direction A.

The actuation part 220 comprises a substantially cylindrical body 230, coaxial to the axis T, and an extension 240, projecting with respect to the body 230 in the direction of the main axis A, which is substantially tangential to the upper part of the body 230. During use, the extension 240 thus faces forwards in the direction of travel of the bicycle.

The extension 240 of the actuation part 220 comprises a first concave upper pressing area 241, adjacent to the body 230, and a second lower pressing area 242, remote from the body and substantially flat or slightly concave.

The extension 240 also comprises a third concave lower pressing area 243, between the body 230 and the second pressing area 242.

The extension 240 also comprises a fourth upper pressing area 244, remote from the body 230, preferably slightly concave.

Figure 13:
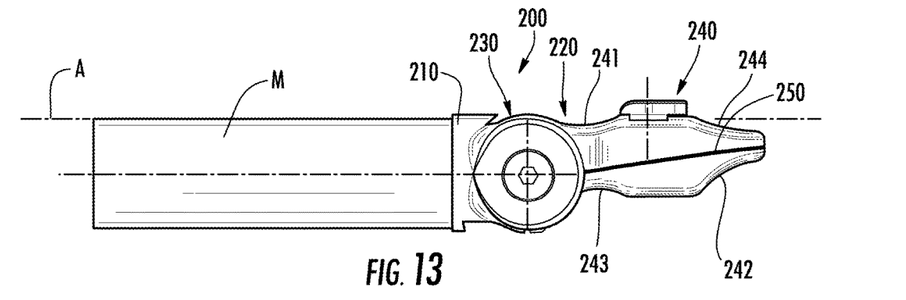
FIG. 13 is a side view of the device of FIG. 12.
Figure 14:
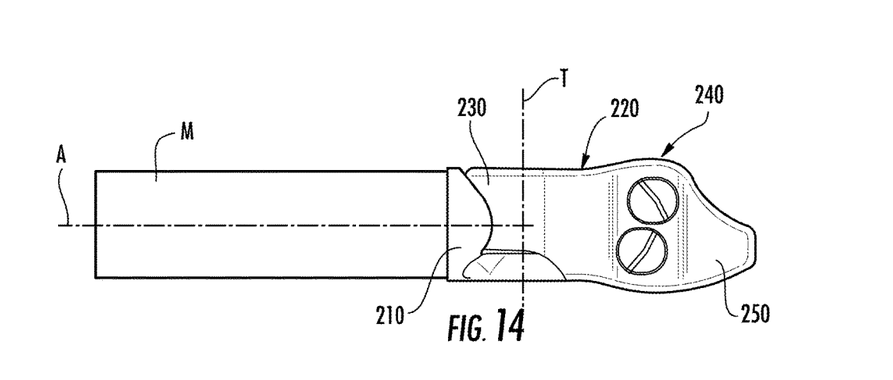
FIG. 14 is a view from above of the device of FIG. 12.

The actuation part 220, more specifically at its extension 240, is in the form of a lever, tapered going away from the mount part 210, see in particular FIGS. 13 and 14. More specifically, the extension 240 of the actuation part 220 has an end portion 250, at the second and fourth pressing areas 242 and 244, remote with respect to the mount part 210; the end portion 250 is tapered, i.e. it has a cross section the area of which reduces going away from the mount part 210 in the direction of travel of the bicycle. Even more specifically, the end portion 250 is so shaped—in plan and/or in a side view—that is tapered going away from the mount part 210.

The actuation part 220—as stated—is angularly mobile with respect to the mount part 110, however not to command gearshifting, unlike the actuation part 120 of the device 100 (or 101, or 102). The actuation part 220 can only take up a neutral position during use, which is adjustable as will be illustrated hereafter.

Figure 17:
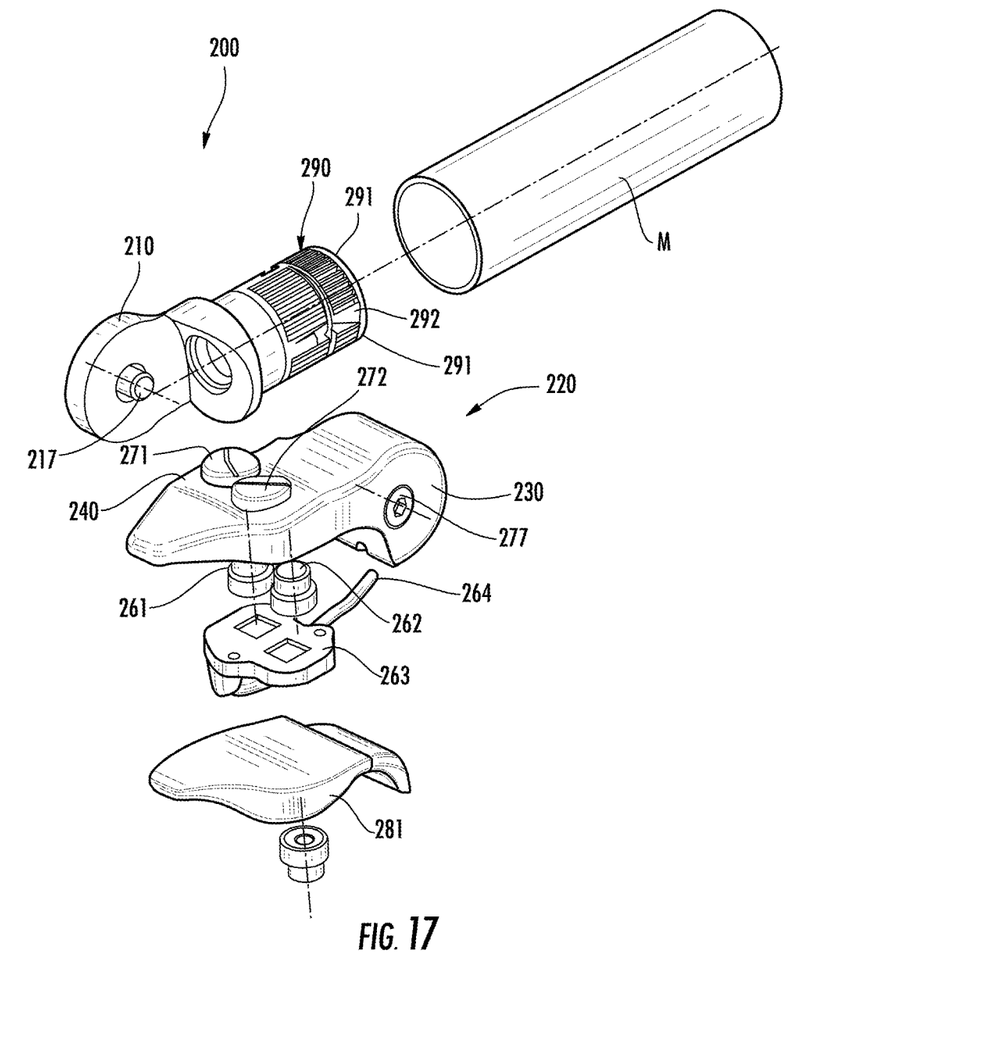
FIG. 17 is an exploded perspective view of the device of FIG. 12.

The device 200 comprises electric actuation means associated with the actuation part 220. More specifically, these means comprise two switches 261 and 262, mounted side-by-side on a plate 263 and connected to a multi-conductor electric cable 264; the plate 263 is fixed underneath the extension 240 of the actuation part 220 and the two switches 261 and 263 facing one another above the extension 240—in front of the first resting area 241 and thus between it and the fourth resting area 244—through respective holes (not highlighted in the figures), protected by respective caps 271 and 272, deformable so as to allow the actuation of the switches 261 and 262. A cover 281 closes the extension 240 at the bottom.

The actuation part 220 is fixed in an adjustable manner with respect to the mount part 110. More specifically, a threaded pin 277 is provided along the axis T, with the stem screwed into a corresponding threaded seat 217 in the mount part 210 and the head engaged on the body 230 of the actuation part 220.

Figure 15:
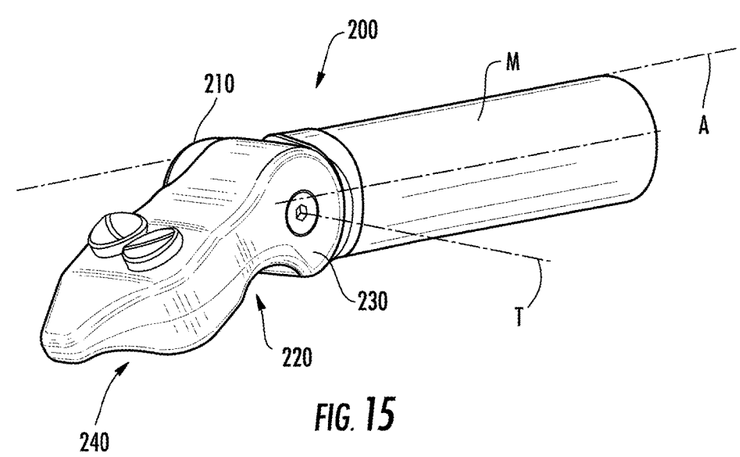
FIG. 15 is a perspective view of the device of FIG. 12, adjusted in a second way, with a cover partially removed.
Figure 16:
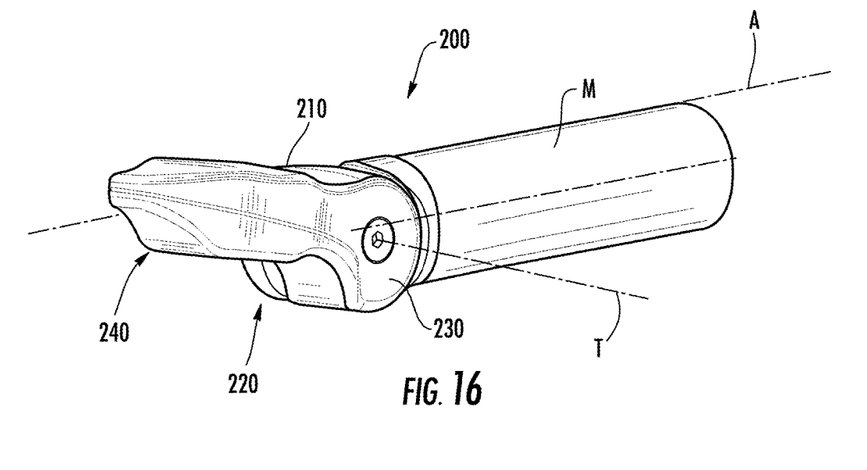
FIG. 16 is a perspective view of the device of FIG. 12, adjusted in a third way, with the cover partially removed.

The angular position of the actuation part 220 can be varied by acting on the threaded pin 277: when the threaded pin 277 is loosened, the actuation part 220 can be moved angularly with respect to the mount part 210, whereas when the threaded pin 277 is tightened, the angular position of the actuation part 220 is locked. FIGS. 15 and 16 illustrate the two extreme angular positions that the actuation part 220 can take up in its neutral position.

The actuation of the switches 216 and 262 (through the deformable caps 271 and 272) triggers the electric gearshifting command, upward or downward. The ways of managing this signal to obtain gearshifting are per se known in the field and will not be described any further.

The device 200 also comprises an expander 290 (per se known and not described in detail) mounted on the mount part 210 for fixing inside the end M of handlebars. The expander 290 comprises splayable sectors 291 and a free angular space 292 between the sectors 291, for the passage of the cable 264 inside the end M of handlebars; see FIG. 17.

Thanks to the particular operation of the device 200, the cyclist can adjust the neutral position of the actuation part 220 by acting on the threaded pin 277 as stated above. The cyclist can easily select the preferred position, according to his own physical characteristics (morphology of the hands) and/or according to his own grip preferences and in general his preferred posture on the bicycle.

Once the neutral position of the actuation part 220 has been set, during use the cyclist grips the handlebars at the end M, with the hand resting on the mount part 210. In a preferred configuration, the cyclist holds his thumb resting on the first pressing area 241, above the extension 140, and the index finger resting on the second pressing area 242 under the extension 220. The thumb is partially sunk into the actuation part 220 due to the concave shape of the first pressing area 241.

With the fingers in this position, the combination of the hand and the device 200 assumes an aerodynamically favourable configuration. Moreover, the cyclist can substantially maintain such a position during any gearshifting, because both the thumb and the index finger are already in a position suitable for acting rapidly on the switches 261 and 262, to obtain the desired gearshifting.

An alternative position for the index finger is offered by the third pressing area 243. When resting in this area, the index finger is bent, partially sunk into the actuation part 220 thanks to the concave shape of the third pressing area 243.

Also in this case, the overall configuration is aerodynamically favourable and the possibilities of manoeuvre remain substantially unaltered.

An alternative position for the thumb is offered by the fourth pressing area 244. When resting in this area, the thumb is stretched out, more than when resting on the first pressing area 241, and partially sunk into the actuation part 220 thanks to the concave shape of the fourth pressing area 244. Also in this case, the overall configuration is aerodynamically favourable and the possibilities of manoeuvre remain substantially unaltered.

In practice, also with the device 200 like for the devices 100, 101 and 102, the cyclist has two alternative positions available both for the thumb, and for the index finger. This possibility is certainly useful, because it does not oblige the cyclist to always maintain the same position (with the risk of cramping) without moreover penalizing aerodynamic functionality.

The invention claimed is:

1. An adjustable bar-end bicycle gearshift, comprising:
a mount part that is configured to be mounted within a forward facing end of a handlebar so that an actuation part mounted on the mount part faces forward in a direction of travel of a bicycle,
wherein the actuation part includes a first electric actuator component and a second electric actuator component that are at predetermined positions with respect to each other, and a shift actuator,
wherein the shift actuator is associated with the actuation part so as to be able to take three operative positions:
a neutral position in which neither the first nor the second electric actuator components are activated and no gearshift is commanded,
a first shift position in which the first electric actuator component is activated and a first shift is commanded, and
a second shift position in which the second electric actuator component is activated and a second shift is commanded; and,
the actuation part includes an adjuster having a fastener within an elongated slot, the elongated slot is dimensioned and configured so that movement of the elongated slot relative to the fastener enables adjusting an angular position of the actuation part with respect to the mount part and with respect to the fastener.

2. Device according to claim 1, wherein the shift actuator includes at least one tapered portion with a cross sectional area which reduces in a direction going away from the mount part in the direction of travel of the bicycle.

3. Device according to claim 1, wherein the actuation part comprises a first concave upper pressing area adjacent to the mount part, and a second lower pressing area remote from the mount part.

4. Device according to claim 3, wherein the actuation part comprises a third concave lower pressing area between the mount part and the second pressing area.

5. Device according to claim 4, wherein the actuation part comprises a fourth upper pressing area remote from the mount part.

6. Device according to claim 5, wherein the fourth pressing area is concave.

7. Device according to claim 3, wherein the second pressing area is concave.

8. Device according to claim 1, wherein the mount part comprises an expander for mounting to the end of the handlebar, said expander comprising splayable sectors and a free angular space for passage of an electric cable for connecting to the electric actuator.

9. Device according to claim 1, wherein the first electric actuator component includes two switches and the second electric actuator component includes two strikers, and the two switches are mounted in one of said mount part and said actuation part, and the two switches are actuated by said respective strikers provided in the other of said mount part and said actuation part when the actuation part is taken into a first and into a second operative position, respectively, each of said switches being intended to command upward or downward gearshifting, respectively.

10. Device according to claim 9, wherein the adjuster varies the angular position of the switches and/or of the strikers to adjust the two operative positions and the neutral position together.

11. Device according to claim 10, wherein the two switches are carried by a plate mounted fixed on the actuation part, the two strikers are formed on a striker-carrying assembly fixed in an adjustable manner with respect to the mount part, and a spring is mounted acting between the actuation part and said striker-carrying assembly, to keep the actuation part in the neutral position in an absence of stresses.

12. Device according to claim 11, wherein the adjuster comprises a lid on which the striker-carrying assembly is mounted in fixed position, the slot is formed in the lid, the fastener comprises a screw inserted in the slot to fix the lid to the mount part in adjustable position, wherein loosening of the screw makes it possible to vary the angular position of the lid and with it of the striker-carrying assembly with respect to the mount part, and retightening the screw locks the selected position.

13. Device according to claim 1 wherein said first electric actuator component comprises two switches mounted on the actuation part, accessible from a top thereof, each of said switches being designated to command upward or downward gearshifting, respectively.

14. Device according to claim 13, wherein loosening of the fastener makes it possible to vary the angular position of the actuation part with respect to the mount part, and retightening the fastener locks the selected position.

15. An adjustable bar-end bicycle gearshift, comprising:
a mount part that is configured to be mounted within a forward facing end of a handlebar so that an actuation part mounted on the mount part faces forward in a direction of travel of a bicycle,
wherein the actuation part includes a first electric actuator component and a second electric actuator component that are at predetermined positions with respect to each other, and a shift actuator,
wherein the shift actuator is associated with the actuation part so as to be able to take three operative positions:
a neutral position in which neither the first nor the second electric actuator components are activated and no gearshift is commanded,
a first shift position in which the first electric actuator component is activated and a first shift is commanded, and
a second shift position in which the second electric actuator component is activated and a second shift is commanded; and,
the actuation part includes an adjuster having a fastener within an arcuate slot for adjusting the position of the actuation part with respect to the mount part;

whereby the actuation part is rotatable about the fastener such that the actuation part takes different angular positions with respect to the mount part.

16. An adjustable bar-end bicycle gearshift, comprising:

a mount part that is configured to be mounted within a forward facing end of a handlebar so that an actuation part mounted on the mount part faces forward in a direction of travel of a bicycle;

wherein the actuation part includes a hollow cylindrical body for housing a first electric actuator component and a second electric actuator component, and a shift actuator formed as an extension projecting radially outwardly from the hollow cylindrical body and the extension defines a forward-most portion of the actuation part, wherein the shift actuator is associated with the actuation part so as to be able to take three operative positions:

a neutral position in which neither the first nor the second electric actuator components are activated and no gearshift is commanded, a first shift position in which the first electric actuator component is activated and a first shift is commanded, and a second shift position in which the second electric actuator component is activated and a second shift is commanded;

wherein the actuation part and the extension are angularly rotatable with respect to a fixed assembly and the fixed assembly is angularly rotatable with respect to the mount part, wherein the fixed assembly is provided with a fastener for adjusting and fixing the angular position of the fixed assembly with respect to the mount part, thereby allowing the actuation part and the extension to take different angular positions with respect to the mount part.

17. The adjustable bar-end bicycle gearshift of claim 16, wherein the extension is cantilevered from the hollow cylindrical body and faces forward in the direction of travel of the bicycle.

18. An adjustable bar-end bicycle gearshift, comprising:

a mount part that is configured to be mounted within a forward facing end of a handlebar so that an actuation part mounted on the mount part faces forward in a direction of travel of a bicycle, wherein the actuation part includes a first electric actuator component and a second electric actuator component that are at predetermined positions with respect to each other, and a shift actuator, wherein the shift actuator is associated with the actuation part so as to be able to take three operative positions:

a neutral position in which neither the first nor the second electric actuator components are activated and no gearshift is commanded, a first shift position in which the first electric actuator component is activated and a first shift is commanded, and a second shift position in which the second electric actuator component is activated and a second shift is commanded; and, the actuation part includes an adjuster having a fastener within an elongated slot for adjusting an angular position of the actuation part with respect to the mount part and with respect to the fastener;

wherein the first electric actuator component includes two switches and the second electric actuator component includes two strikers, and the two switches are mounted in one of said mount part and said actuation part, and the two switches are actuated by said respective strikers provided in the other of said mount part and said actuation part when the actuation part is taken into a first and into a second operative position, respectively, each of said switches being intended to command upward or downward gearshifting, respectively; and wherein the adjuster varies the angular position of the switches and/or of the strikers to adjust the two operative positions and the neutral position together.

* * * * *